US008484108B2

(12) United States Patent
Hunt et al.

(10) Patent No.: US 8,484,108 B2
(45) Date of Patent: Jul. 9, 2013

(54) TRACKING ENTITIES DURING IDENTITY RESOLUTION

(75) Inventors: Brand Lee Hunt, Las Vegas, NV (US); Mark Maurice Mezofenyi, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1519 days.

(21) Appl. No.: 11/561,230

(22) Filed: Nov. 17, 2006

(65) Prior Publication Data

US 2008/0120271 A1    May 22, 2008

(51) Int. Cl.
  *G06F 17/30* (2006.01)
(52) U.S. Cl.
  USPC .............................................. 705/35; 705/37
(58) Field of Classification Search
  USPC ..................................................... 705/35, 37
  See application file for complete search history.

(56) References Cited

U.S. PATENT DOCUMENTS

| | | | | |
|---|---|---|---|---|
| 5,237,662 | A * | 8/1993 | Green et al. .................. | 718/100 |
| 5,832,496 | A * | 11/1998 | Anand et al. ........................... | 1/1 |
| 5,924,094 | A * | 7/1999 | Sutter .............................. | 707/10 |
| 6,016,489 | A | 1/2000 | Cavanaugh et al. | |
| 6,240,421 | B1 | 5/2001 | Stolarz | |
| 6,266,667 | B1 * | 7/2001 | Olsson ............................ | 707/10 |
| 6,332,163 | B1 * | 12/2001 | Bowman-Amuah .......... | 709/231 |
| 6,704,741 | B1 | 3/2004 | Lively, Jr. et al. | |
| 6,751,600 | B1 | 6/2004 | Wolin | |
| 6,760,746 | B1 * | 7/2004 | Schneider ...................... | 709/203 |
| 2003/0182310 | A1 * | 9/2003 | Charnock et al. .......... | 707/104.1 |
| 2004/0088369 | A1 * | 5/2004 | Yeager et al. .................. | 709/217 |
| 2004/0230572 | A1 * | 11/2004 | Omoigui ........................... | 707/3 |
| 2005/0192893 | A1 * | 9/2005 | Keeling et al. .................. | 705/39 |
| 2005/0289642 | A1 * | 12/2005 | Pacholec et al. .................. | 726/4 |

OTHER PUBLICATIONS

Silvestri, F. et al.; Assigning Document Identifiers to Enhance Compressibility of Web Search Engines Indexes; ACM Digital Library; ACM 1581138121/03/04;2004; USA.

Lee, S-L.; An Integrated Hierarchical File Organization for Data Selection and Retrieval; ACM Digital Library; ACM 0-89791-159-8/85/006/0233; 1985; USA.

* cited by examiner

*Primary Examiner* — Thomas Dixon
*Assistant Examiner* — Gerald Vizvary
(74) *Attorney, Agent, or Firm* — Shimokaji & Assoc. PC

(57) ABSTRACT

A method of tracking entities for identity resolution in database systems comprises assigning each account of a plurality of accounts a unique entity belonging only to the account and in which the account is contained; keeping track of the age of each account of the plurality of accounts; and assigning an identifier to any entity as the identifier of the unique entity of the oldest account contained in the entity. This simple method of assigning identifiers to accounts and entities solves a number of identity resolution problems known in the art including: lost entity identifier problem, lost entity version problem, entity switched warm bodies/accounts problem, and account drift problem.

18 Claims, 7 Drawing Sheets

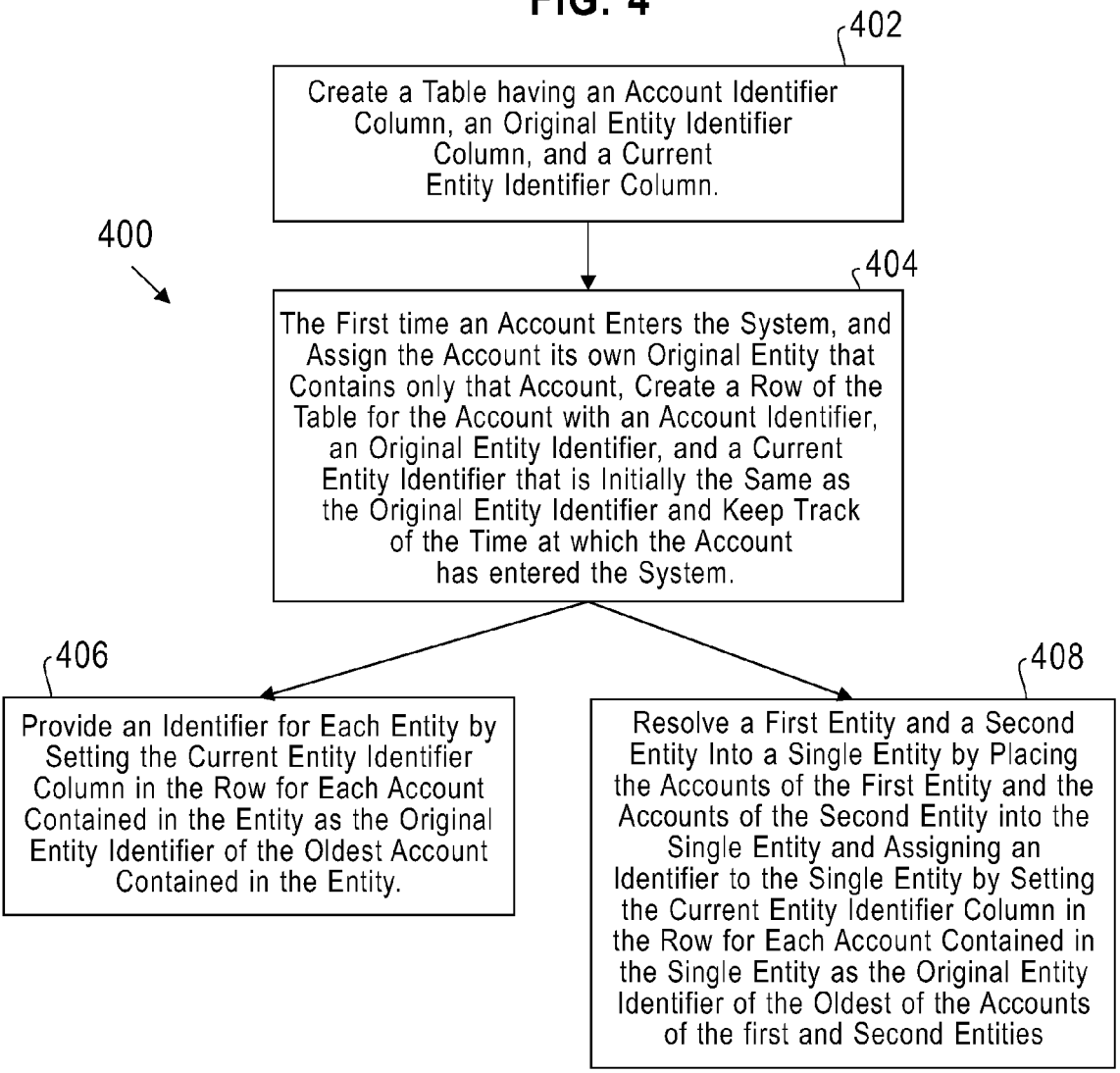

| Previous_Entity_Version_Identifier | Child_Entity_Identifier | Res_Type | Entity_Version_Identifier | Entity_Identifier | Timestamp |
|---|---|---|---|---|---|
| 0 | e1 | R | v1 | e1 | t0 |
| 0 | e2 | R | v2 | e2 | t0 |
| 0 | e3 | R | v3 | e3 | t0 |
| 0 | e4 | R | v4 | e4 | t0 |
| v2 | e2 | R | v5 | e2 | t1 |
| *v3* | *e3* | *R* | *v5* | *e2* | *t1* |
| v1 | e1 | R | v6 | e1 | t2 |
| v5 | e2 | R | v6 | e1 | t2 |
| v5 | e3 | R | v6 | e1 | t2 |
| v6 | e1 | R | v7 | e1 | t3 |
| v6 | e2 | R | v7 | e1 | t3 |
| v4 | e4 | R | v7 | e1 | t3 |
| v7 | e1 | U | v8 | e1 | t4 |
| v7 | e3 | U | v8 | e1 | t4 |
| v7 | e2 | U | v9 | e2 | t4 |
| v7 | e4 | U | v9 | e2 | t4 |

502
Create a Table having a Previous Entity Version Identifier Column, a child Entity Identifier Column, a Resolution Type Column, an Entity version Identifier Column, an Entity Identifier Column and a Timestamp Column.

504
Provide an Identifier for Each Entity by Setting the Current Entity Identifier Column in the Row for the Entity as the Unique Entity Identifier of the Oldest Account Contained in the Entity - for example, Using a Table having an Account Identifier Column, an Original Entity Identifier Column, and a Current Entity Identifier Column - and Assign Each Entity a Version Number in Sequence and a Timestamp.

506
Whenever a (Previous) Entity Changes into a New Entity, Assign the new Entity the Next Version Number in Sequence, Assign the New Entity a Previous Entity Identifier that is the Version Number of the (Previous) Entity, Create a Row in the Version Tracking Table for Each Entity (Child Entity) Contained in the Next Version of the New Entity and Indicate in the Row whether the Change is a Resolve or an Unresolve

FIG. 8

TRACKING ENTITIES DURING IDENTITY RESOLUTION

BACKGROUND OF THE INVENTION

The present invention relates generally to the field of information storage and retrieval using databases and, more specifically, to identity resolution for entities which may have more than one identifier.

Database systems are widely used to keep information about real (as opposed to virtual, e.g., information in a computer) world objects—such as an individual person, groups of people, organizations, and businesses, for example—organized in such a way that information about the object becomes readily accessible. Of fundamental importance for such a function is the ability to identify each object about which information is to be kept and accessed in a well-defined way so that each object has an identity.

The word "identity" may be defined as an alias for a real-world object (referred to as a "warm body") that is typically specified by the warm body. For example, an identity may be a name, social security number, driver's license number, or Medicaid number, or so forth.

The word "account" may be defined as a collection of identities and other information about a single warm body. By definition, a single account represents one, only one, and always the same, warm body. For example, a single account might contain identities such as names, a social security number, and a driver's license number, as well as other information such as hair color, age, and height. Accounts are typically specified by the user of the database system. Some examples of accounts are credit card accounts, bank accounts, and airline passenger accounts.

The word "entity" may be defined as a collection of one or more accounts. Entities are typically specified by the database system, and may be loosely characterized as the system's attempt at representing a warm body. A "warm body" may be defined as a physical thing in the real world (often a human being, for example, but possibly any object about which information may be kept such as an aircraft, a vehicle, or a corporation) that typically has multiple identities, multiple accounts, and multiple entities.

One basic function of an identity resolution system is to represent each distinct warm body as a unique entity. For example, if an identity resolution system has information that a first entity and a second entity represent the same warm body, the identity resolution system may "resolve" the two separate entities into a single entity. Conversely, if a single entity in an identity resolution system has information that appears to belong to two separate warm bodies, the identity resolution system may attempt to "un-resolve" the single entity into two separate entities matched to the two distinct warm bodies.

One of the primary purposes of an identity resolution system is to resolve seemingly disparate accounts together. That is, the system may currently be under the assumption that two accounts represent two distinct warm bodies. As more information comes into the system the identity resolution system may detect "enough" similarities between those two accounts that the system decides that those two accounts actually represent the same warm body—in which case the system "resolves" those two accounts. When such a resolution decision is correct the system is functioning as desired. All the accounts that are currently known by the system to represent the same warm body are then held in a single entity. In the ideal situation, there would be a single entity in the system for each unique warm body that has accounts in the system.

Initially, however, the system usually has multiple entities per warm body. The following relationship holds by definition in the system:

number of accounts≧number of entities≧number of warm bodies.

In general, as time progresses and more information enters the system for accounts, the number of entities in the system moves away from the number of accounts in the system and converges down towards the number of warm bodies attached to those accounts.

Certain types of problems, however, are generally encountered. For example, the system may incorrectly resolve two entities, meaning the system incorrectly thinks (e.g., maintains information) that two distinct warm bodies are the same warm body—referred to as the "incorrect resolve problem". There is also, for example, an "incorrect unresolve problem", in which two accounts that have been correctly resolved as referring to the same warm body are at some point incorrectly unresolved, i.e., the system incorrectly enters a state in which the system thinks the two accounts represent two distinct warm bodies.

There are several known problems related to keeping track of entities and their identities as the entities are resolved and unresolved in an identity resolution system. One problem may be referred to as the "lost entity identifier problem" in which, after two entities are resolved into a single entity, the single entity may not be identifiable by one or another of its previous identifiers so that a user of the system, when searching using the previous identifiers, does not find the (new) single entity, which now appears lost to the user.

Another problem may be referred to as the "lost entity version problem". For example, the entity of interest may be still identifiable after a resolution, yet that entity may have changed enough, e.g., through addition/deletion of accounts, that, although the previous version fit a context in which a user wanted to look at the entity, the structure of the present version no longer makes sense in the context in which the user is looking at the entity.

Another problem may be referred to as the "entity switched warm bodies/accounts problem". For example, the system initially associates one entity identity to one warm body, and then, after a series of resolves and unresolves, uses that same entity identity to refer to a completely different warm body, so that a user—with an expectation that entity identities should be the same as warm body identities—of the system may become confused.

Another problem may be referred to as the "account drift problem". For example, during a long sequence of resolves and unresolves, a single account may show up, by itself, in many different entities and each of those entities may have a different identity than all of the others. Under such circumstances, the account appears to "drift" from one entity to another. The key feature of this problem is that the system looks like it's superficially re-inventing entity identities for the same account/warm body—over and over again. Thus, the account appears to be drifting, by itself, from one entity to another so that a user of the system may become confused.

Notwithstanding the current techniques, there is a need in the art for entity tracking and identity resolution for entities that may have more than one identifier, which provide solutions for a number of problems encountered in the art—such as the "lost entity identifier problem", the "lost entity version problem", the "entity switched warm bodies/accounts problem", and the "account drift problem".

SUMMARY OF THE INVENTION

In one embodiment of the present invention, a computer-implemented method of tracking entities in a database comprises assigning each account of a plurality of accounts a unique original entity identifier belonging only to the account, in which the unique original entity identifier is the unique entity identifier assigned to a unique original entity that contains only the account and contains no other accounts; and keeping track of the age of each account of the plurality of accounts.

In another embodiment of the present invention, an identity resolution system for a database being accessed by the identity resolution system is disclosed that executes: creating an entity tracking table having an account identifier column, an original entity identifier column, and a current entity identifier column; and in response to an account entering the identity resolution system, creating a row of the entity tracking table with an account identifier for the account, an original entity identifier of a unique entity assigned to the account, and a current entity identifier equal to the original entity identifier.

In still another embodiment of the present invention, a computer program product comprises a computer useable medium including a computer readable program, wherein the computer readable program when executed on a computer causes the computer to: 1) create an entity version table having an entity version identifier column, an entity identifier column, and a timestamp column; and 2) create a new version of an entity including: assigning the new version a version number in sequence across all entities; and creating a row in the entity version table for each entity contained in the new version of the entity, wherein each of the created rows has the version number in the entity version identifier column, an identifier of the new version of the entity in the entity identifier column, and a timestamp of the new version of the entity in the timestamp column.

These and other features, aspects and advantages of the present invention will become better understood with reference to the following drawings, description and claims.

BRIEF DESCRIPTION OF THE DRAWINGS

FIG. 4 is an exemplary entity tracking table in accordance with an embodiment of the present invention;

FIG. 5 is a flowchart illustrating a method of entity tracking, using an entity tracking table such as that shown in FIG. 4, in accordance with an embodiment of the present invention;

FIG. 6 is an exemplary entity version tracking table in accordance with an embodiment of the present invention;

FIG. 8 is a flowchart illustrating a method of entity version tracking, using an entity version tracking table such as that shown in FIG. 6, in accordance with an embodiment of the present invention.

To facilitate understanding, identical reference numerals have been used, where possible, to designate identical elements that are common to some of the figures.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides tracking of entities during identity resolution of entities for an identity resolution system in a database system. Embodiments may be used in conjunction with commercial databases, for example, any database that tracks accounts—such as credit card accounts, bank accounts, and airline passenger accounts—associated with a "warm body" that has a unique identity—such as an individual person or a corporation. For example, an identity resolution system in accordance with the present invention could be used by a bank or credit card company to keep track of accounts or could be used by, for example, an airline in an airline passenger reservation and ticketing system.

By maintaining a unique identification of each entity (e.g., an identifier of a unique entity of an oldest account contained in the entity) in a database, embodiments of the present invention differ, for example, from prior art identity resolution systems that do not maintain such a unique identification by either creating new identifiers for entities or re-using identifiers for different entities than that to which the identifier originally belonged. Embodiments of the present invention thereby differ from prior art identity resolution systems by solving a number of identity tracking problems not solved by the prior art, for example, the "lost entity identifier problem", the "entity switched warm bodies/accounts problem", and the "account drift problem". In addition, by maintaining a history of entity versions in an identity resolution system, embodiments of the present invention differ, for example, from prior art identity resolution systems that do not maintain version histories and, therefore, cannot solve the "lost entity version" problem solved by embodiments of the present invention.

Figure 1:
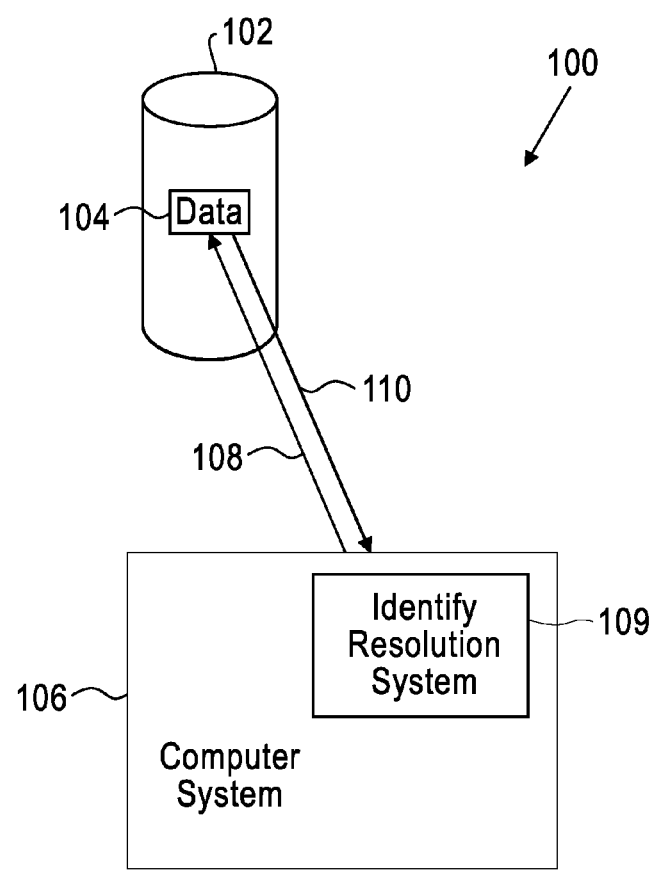
FIG. 1 is a system block diagram illustrating a database system having an identity resolution system in accordance with an embodiment of the present invention.

FIG. 1 illustrates database system 100 in accordance with one embodiment of the present invention. System 100 may include a data storage device 102, which may comprise a disk drive or other computer readable data storage device, which may, for example, be accessed over a network. Data storage device 102 may include a dataset 104 that may be readable from data storage device 102 by a computer system 106. Computer system 106 may include devices for receiving inputs, for example, from human users or from other systems and devices (not shown). Computer system 106 may also include devices for displaying information to human users, for example, or for providing electronic outputs to other systems and devices and enable such external communication to and from identity resolution system 109. In particular, computer system 106 may provide insertion and deletion transactions 108 to the dataset 104. Transactions 108 may originate, for example, from identity resolution system 109. Also, computer system 106 may receive information from dataset 104 via data accesses 110 of the dataset 104 and provide the information to identity resolution system 109.

Figure 2:
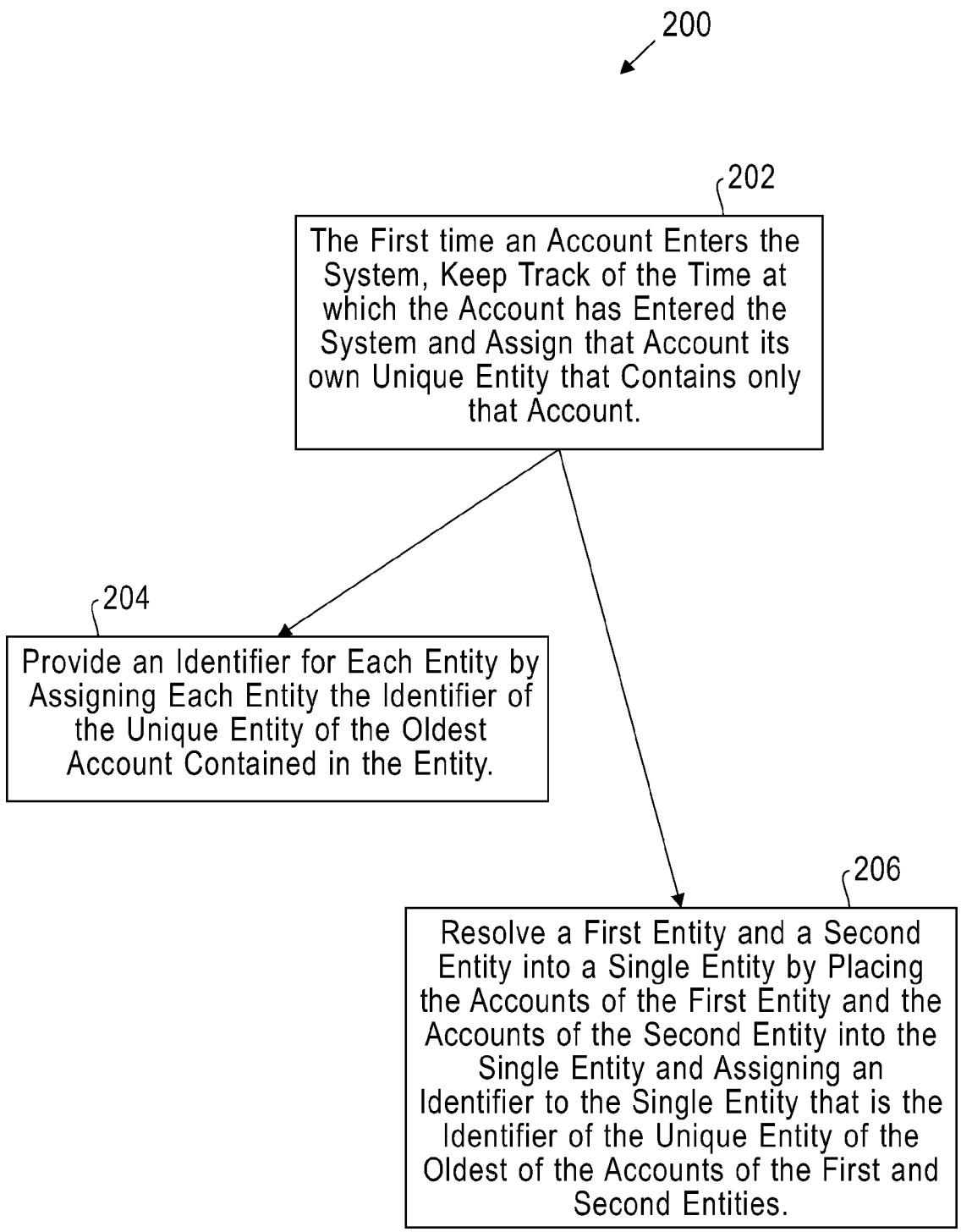
FIG. 2 is a flowchart illustrating an entity tracking method in accordance with an embodiment of the present invention.

FIG. 2 illustrates one exemplary implementation for entity tracking method 200, which may be implemented, for example, in the database system 100 shown in FIG. 1. An account may enter system 100 at process 202, for example, by having information regarding the account received by computer system 106. For example, computer system 106 may receive data input from a human user or via a network connection from some other computer. The information may be entered into dataset 104 via a transaction 108. The information may also be processed by identity resolution system 109 and additional information regarding the account, e.g., entity and identity information, may also be entered into dataset 104 via a transaction 108 from identity resolution system 109. At process 202, identity resolution system 109 may determine whether the account is already in system 100 or not or, in the alternative, may keep track of the time that the account entered the system, and so may determine whether it is the first time the account has entered the system 100.

Figure 3:
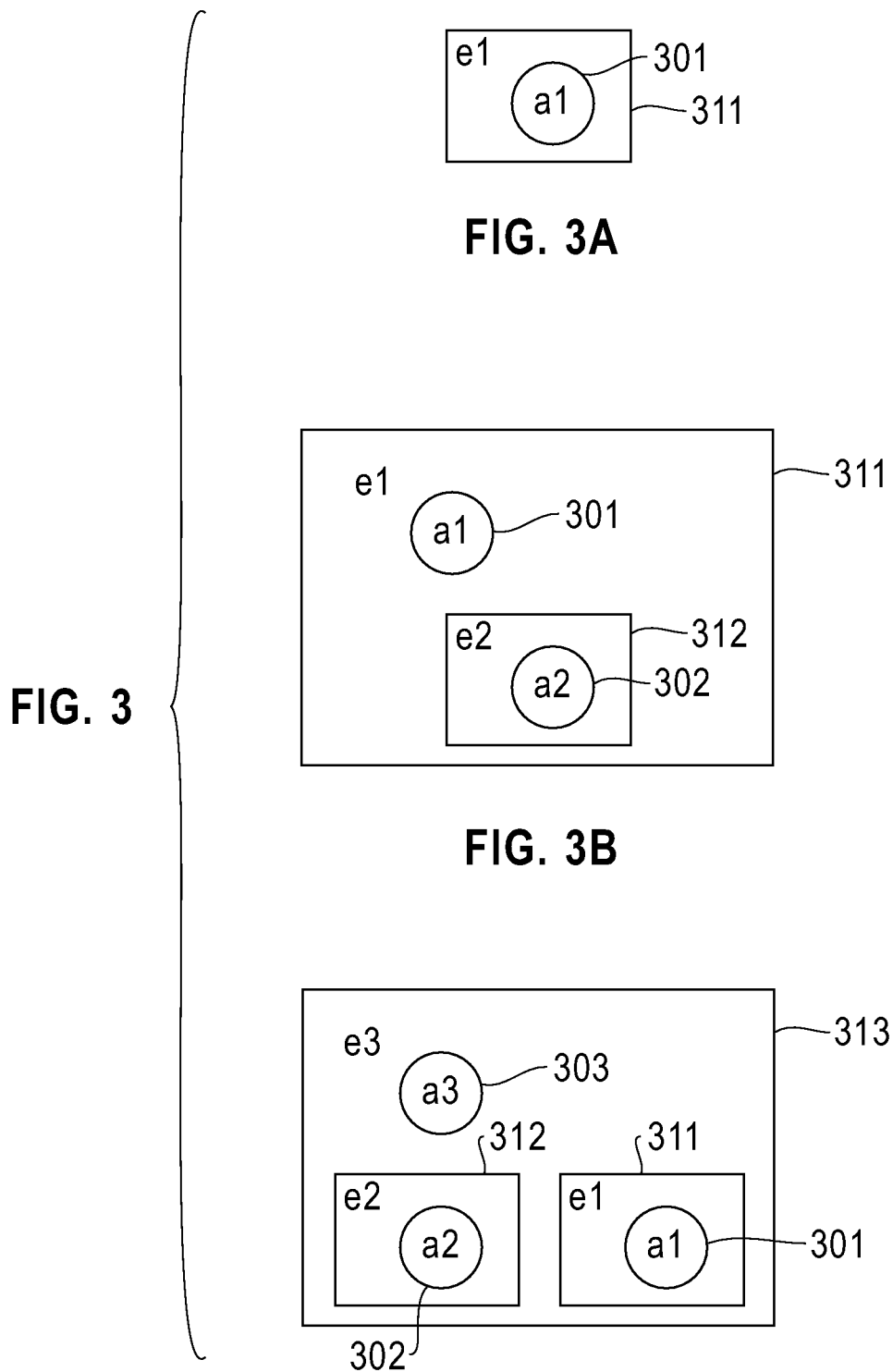
FIG. 3 is a set of diagrams—FIG. 3A, FIG. 3B, and FIG. 3C—each diagram showing an exemplary graphical representation for accounts and entities in accordance with an embodiment of the present invention.

Referring to FIG. 3A of FIG. 3, the first time an account (e.g., account a1 301 shown in FIG. 3A) enters the system 100, method 200 at process 202 may assign that account a1 301 its own unique entity e1 311 (graphically represented in FIG. 3A by the box of e1 311 surrounding the circle of a1 301). So, directly after an account a1 301 enters the system 100, there may be one entity e1 311 in the system 100 that contains that account a1 301 and that entity e1 311 may contain no other accounts (as seen at FIG. 3A). Thus, each account (e.g., a1 301) may have an "original" (or oldest) entity (e.g., e1 311) and each entity (e.g., e1 311) may have an "original" (or oldest) account (e.g., a1 301).

Referring to FIG. 3B, an entity (e.g., entity e1 311 shown in FIG. 3B) may be defined as a collection of one or more accounts (e.g., accounts a1 301, a2 302 shown in FIG. 3B). At process 204, method 200 may look for the oldest account (e.g., a1 301) in the collection of accounts (e.g., a1 301, a2 302) of an entity (e.g., e1 311). That oldest account may have an original entity which may have an identifier (e.g., "123"). Method 200, at process 204 may re-use the identifier for that oldest entity (that is, "123") as the identifier for the entity in question. Using FIG. 3B for example, suppose that "e1" is the identifier of the original entity e1 311 for account a1 301, and "e2" is the identifier of the original entity e2 312 for account a2 302. Also, assume that account a1 301 is older than account a2 302 (that is, a1 301 was entered into the system before a2 302). When the system merges (i.e., resolves) accounts a1 301 and a2 302 into a single entity (e1 311 in FIG. 3B), the identifier assigned to that merged entity (e1 311 in FIG. 3B) may be "e1" because a1 301 is older than a2 302 and "e1" is the identifier of the original entity e1 311 for a1 301.

In the graphical representations of FIGS. 3A, 3B, and 3C each entity square may directly contain exactly one account circle. More specifically, the square for entity e1 311 may directly contain the account circle for its original account a1 301, the square for entity e2 312 may directly contain the circle for its original account a2 302, and the square for entity e3 313 may directly contain the circle for its original account a3 303. By definition, because the square for entity e1 311 also contains the square for entity e2 312 (see FIG. 3B), entity e1 311 may be said to indirectly contain account a2 302. The graphical representations of FIGS. 3A, 3B, and 3C may reflect the continuing (or permanent) identification relationship between an account and its original entity (or, between an entity and its original account) established by method 200 at processes s 202 and 204 that each entity may directly contain only the account it uniquely identifies (e.g., account for which it is the original entity) and may indirectly contain all other accounts, each of which may be still contained in its own uniquely identifying (e.g., original) entity.

FIG. 3C illustrates an example in which accounts a1 301 and a2 302, as represented by FIG. 3B, may be merged with an account a3 303, which may happen to be older than either of a1 301 or a2 302. In this example, the representation of FIG. 3B does not occur as an entity square in the square for entity e3 313. Instead, all merged accounts are placed at the same level in the representation (rather than hierarchically) reflecting the relationship established by method 200 at process 206 that each entity directly contains only the account it uniquely identifies (e.g., account for which it is the original entity) and indirectly contains (at a single level) all other accounts, each of which is still contained in its own uniquely identifying (e.g., original) entity. In the example shown in FIG. 3C, because a3 303 may be the oldest of accounts a1 301, a2 302, and a3 303, the identifier of the original entity of a3 303 (e.g., identifier "e3") may be used as the identifier of the resolved entity, e.g., entity e3 313.

Because of the permanent identification connection between an account and its original (uniquely identifying) entity established by method 200, it may be the case that any entity in identity resolution system 109 that contains an account also "contains" that account's original entity and— conversely—that for any account contained in an entity in identity resolution system 109, that entity also "contains" that account's original (or identifying) entity. Thus, the following expressions may be regarded as equivalent:

"accounts a1, a2, and a3 have been resolved (or merged) into the single entity e1", "entities e1, e2, and e3 have been resolved (or merged) into the single entity e1", "the entity e1 contains the accounts a1, a2, and a3", and "the entity e1 'contains' the entities e1, e2 and e3".

In other words, in an identity resolution system—such as identity resolution system 109—that uses entity tracking method 200, the above four expressions may all have the same meaning.

FIG. 5 illustrates one exemplary embodiment for a method 400 for entity tracking using a table—such as entity tracking table 401 shown in FIG. 4—in a database system—such as database system 100.

At process 402, method 400 may create entity tracking table 401 having a column 411 for an account identifier (labeled ACCOUNT_IDENTIFIER), a column 412 for an original entity identifier (labeled ORIGINAL_ENTITY_IDENTIFIER), and a column 413 for a current entity identifier (labeled CURRENT_ENTITY_IDENTIFIER) in each row of the entity tracking table 401. For example, implementation of method 400 on computer system 106 may cause computer system 106 to write the appropriate information for setting up entity tracking table 401 to data storage device 102, and information stored in entity tracking table 401 may likewise be accessible to a user of identity resolution system 109 through computer system 106.

At process 404, in response to an account (e.g. a1 301) entering the identity resolution system 109 for the first time, method 400 may create a row 421 of the entity tracking table 401 with an account identifier for the account (e.g., a1 431 in the first row 421, ACCOUNT_IDENTIFIER column 411 of entity tracking table 401), an original entity identifier of a unique entity assigned to the account (e.g., e1 441 in the first row 421, ORIGINAL_ENTITY_IDENTIFIER column 412), and a current entity identifier equal to the original entity identifier (e.g., e1 451 in the first row 421, CURRENT_ENTITY_IDENTIFIER column 413. Method 400 may also provide an age timestamp, i.e., an original timestamp at the time the account first enters the system (and that does not change) so that accounts may be compared to determine which account is oldest.

In entity tracking table 401, the values in the ACCOUNT_IDENTIFIER column 411 and ORIGINAL_ENTITY_IDENTIFIER column 412 may be static—that is, set when a row is created and never changed after that. The value of the CURRENT_ENTITY_IDENTIFIER column 413 may be dynamic—that is, always updated to reflect whatever entity currently contains the corresponding account, i.e., account identified in the same row of the table. For example, in the second row 422 of entity tracking table 401, the value of the CURRENT_ENTITY_IDENTIFIER 452 may have been updated to e1 from its original value of e2 442.

Entity tracking table 401 may be used, for example, to retrieve any of the following:
the original entity for any given account;
the original account for any given entity;
the entity that currently contains any given account;
the entity that currently "contains" any given entity;
all the accounts currently contained by any given entity; or
all the entities currently "contained" by any given entity.

At process 406, method 400 may provide an identifier for an entity by setting the current entity identifier column in the row for each account contained in the entity as the original entity identifier of the oldest account contained in the entity. For example, in the second row 422 of entity tracking table 401, the value of the CURRENT_ENTITY_IDENTIFIER 452 may have been set to "e1" because account a2 302 may have been placed in entity e1 301 when it first entered the identity resolution system 109 (after receiving its original entity identifier e2 442) and a1 301 may have been the oldest account among a1 301 and a2 302.

At process 408, method 400 may resolve a first entity and a second entity into a single, merged entity by placing the accounts of the first entity and the accounts of the second entity into the merged entity and assigning an identifier to the merged entity by setting the current entity identifier column in the row for each account contained in the single entity as the original entity identifier of the oldest of the accounts of the first and second entities. For example, in row 422 of entity tracking table 401, the value of the CURRENT_ENTITY_IDENTIFIER 452 may have been set to "e1" from its original value of e2 442 because e1 311 and e2 312 may have been merged (i.e. resolved) and a1 301 may have been the oldest account among a1 301 and a2 302, and, likewise, in row 421, the value of the CURRENT_ENTITY_IDENTIFIER column 413 may have been set to e1 451 (or left at e1 451 since that may have been its original value) because e1 311 and e2 312 may have been merged (i.e. resolved) and a1 301 may have been the oldest account among a1 301 and a2 302.

Figure 7:
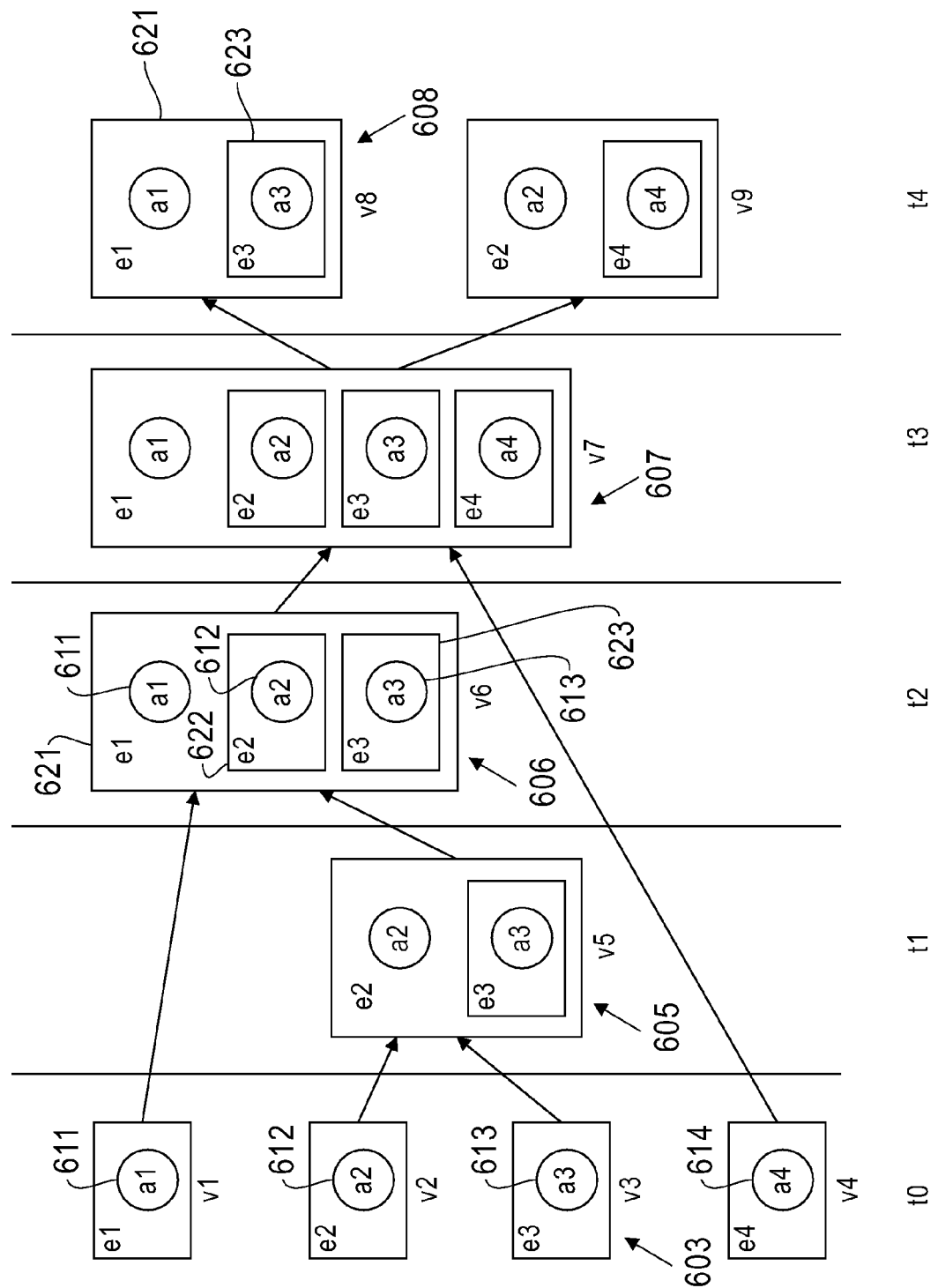
FIG. 7 is a graphical representation of versions of entities changing through time that are represented by the table of FIG. 6.

FIGS. 6 and 7 show an example of the operation of method 500 and FIG. 8 illustrates an embodiment of method 500 for entity version tracking using a table—such as table 501—in a database system—such as database system 100. FIGS. 6 and 7 provide a specific simplified example of operation of method 500.

At process 502 (see FIG. 8), method 500 may create entity version tracking table 501 (see FIG. 6) having a column 511 for a previous entity version identifier (labeled PREVIOUS_ENTITY_VERSION_IDENTIFIER), a column 512 for a child entity identifier (labeled CHILD_ENTITY_IDENTIFIER), a column 513 for a resolution type (labeled RES_TYPE), a column 514 for an entity version identifier (labeled ENTITY_VERSION_IDENTIFIER), a column 515 for an entity identifier (labeled ENTITY_IDENTIFIER), and a column 516 for a timestamp (labeled "timestamp"). The data corresponding to a specific entity version at specific time (e.g., times t0, t1, t2, etc.)—e.g., as illustrated by the example of FIG. 7—may be placed in each row of the entity version tracking table 501. For example, implementation of method 500 on computer system 106 may cause computer system 106 to write the appropriate information for setting up entity version tracking table 501 to data storage device 102, and information stored in entity tracking table 501 may likewise be made accessible to a user of identity resolution system 109 through computer system 106.

At process 504, method 500 may assign each entity in the identity resolution system 109 an identifier, for example, as assigned by method 300 or by method 400, so that, for example, entity version tracking table 501 may be used in conjunction with entity tracking table 401. Method 500 at process 504 may also provide a timestamp for each entity version. The timestamp provided for each entity version by method 500 may be distinct and separately maintained from the age timestamp provided for each account by methods 300 or 400.

The columns 511-516 of entity version tracking table 501 may show the structure of (e.g., the entities contained by) every version (historical and current) of every entity in the identity resolution system 109. Each version of any entity may be retrievable given its ENTITY_VERSION_IDENTIFIER (data in the ENTITY_VERSION_IDENTIFIER column 514 of entity version tracking table 501). The columns of entity version tracking table 501 may also allow reconstruction of the history of any entity forwards and backwards from any point in time to any other point in time. For example, the backwards history of an entity may be a tree in the graphical representation given by FIG. 7 rooted at some time, tn, and going back to the leaves of the tree at the beginning time t0. It may not be apparent at time t0 which "leaf" entities will become involved in the history tree of any entity. However, the entity version tracking table 501 may contain enough information to find all the leaf entities in the history tree of any entity version—even if that history tree contains both resolves and unresolves.

The columns of the entity version tracking table 501 may be ordered as shown in FIG. 6 so that they can be "read" from left to right in a particular way. For example, the sixth row 526 (with underlined contents) may be read as follows:
"v3 of e3 Resolved into v5 of e2 at time t1".
The above sentence may be observed to be represented in the graphical representation of FIG. 7 by version v3 603 at time t0 and version v5 605 at time t1. Every account represented in FIG. 7 may have been assigned an entity identifier according to method 300 or method 400. The example illustrated by FIGS. 6 and 7 may assume that accounts a1 611, a2 612, a3 613, and a4 614 were entered into the identity resolution system 109 in that order.

The entity version numbers, shown as v1, v2, etc. in FIG. 7, may be assigned in sequence across all entities and not across individual entities, as at process 504 of method 500. For example, the "third" version of e1 607, as exists at time t3, may be labeled 'v7' and not ' v3'. Assigning sequence numbers across all entities may allow method 500 to clearly and concisely specify any version of any entity. So, for example, if a user asks for the "third" version of e1 607 (i.e., what is v7 607 in FIG. 7), rather than asking directly for "v7" of e1, the identity resolution system 109 may need to search entity version tracking table 501. The identity resolution system 109 may easily be programmed to translate between version numbers sequenced across all entities and version numbers sequenced across individual entities, and so the computer system 106 (including GUI (graphical user interface)) may hide this distinction.

Some further aspects of the operation of method 500 may be observed from the entity version tracking table 501 shown in FIG. 6 and the related graphical representation shown in FIG. 7. For example, the first three bold (non-italicized) rows 527, 528, and 529 in the entity version tracking table 501 show that at time t2 (see column 516, rows 527-529 in table 501) version 6 (v6, see column 514 in table 501 and v6 606 in FIG. 7) of entity e1 (v6 606) may consist of child entities e1 621, e2 622, and e3 623 as shown in FIG. 7. Because each entity has its own unique original account, these same three bold rows (i.e., rows 527, 528, and 529), in conjunction with the entity tracking table 401, may indicate that v6 of e1 (v6 606) may consist of accounts a1 611, a2 612, and a3 613 (by looking at the original entity identifiers "e1", "e2", and "e3" of a1 611, a2 612, and a3 613 shown in the CHILD_ENTITY_IDENTIFIER column 512 of rows 527, 528, and 529)—which can also be seen in FIG. 7 by looking at the structure of v6 606. The same rows 527, 528, and 529 may also indicate what (historical versions of) entities were Resolved (each row 527, 528, and 529 has an R in the RES_TYPE column 513) together to create v6 of e1 (v6 606), for example:

v1 of e1 (PREVIOUS_ENTITY_VERSION_IDENTIFIER, CHILD_ENTITY_IDENTIFIER of row 527);

v5 of e2 (PREVIOUS_ENTITY_VERSION_IDENTIFIER, CHILD_ENTITY_IDENTIFIER of row 528);

v5 of e3 (PREVIOUS_ENTITY_VERSION_IDENTIFIER, CHILD_ENTITY_IDENTIFIER of row 529)

combined to create v6 of e1 (v6 606). These relationships may be observed to be graphically represented at times t0, t1, and t2 as seen in FIG. 7.

Similarly, the italicized bold rows (rows 534, 535) show that v8 of e1 (v8 608) may consist of child entities e1 621 and e3 623 (column 512 (rows 534, 535) of table 501 shows the entity identifiers "e1", "e3", respectively of accounts a1 621 and a3 623 so that v8 of entity e1 (v8 608) may be said to contain accounts a1 621 and a3 623 as seen in FIG. 7 at time t4). More specifically, rows 534 and 535 show that v8 of e1 (v8 608) may have been Unresolved (each row 534 and 535 has a U in the RES_TYPE column 513) from v7 607, for example:

v7 of e1 (PREVIOUS_ENTITY_VERSION_IDENTIFIER, CHILD_ENTITY_IDENTIFIER of row 534);

v7 of e3 (PREVIOUS_ENTITY_VERSION_IDENTIFIER, CHILD_ENTITY_IDENTIFIER of row 535).

These relationships may be observed to be graphically represented at times t3 and t4 as seen in FIG. 7. Thus, the entity version tracking table 501 may be used to trace any part of, or the entire, history of any entity in identity resolution system 109.

Thus, when identity resolution system 109 creates a new version of an entity, method 500, at process 506, may create a new row in the entity version tracking table 501 having the version number (in the ENTITY_VERSION_IDENTIFIER column 514) of the new version (e.g., as assigned at process 504 across all entities); an entity identifier for the entity of which there is a new version (in the ENTITY_IDENTIFIER column 515); and a timestamp of the new version of the entity (in the "timestamp" column 516). Method 500 may also indicate the type of operation (e.g., resolve or unresolve) creating the new version, for example, by entering an R or U (respectively) in the RES_TYPE column. Method 500 may also create rows for the new entity version by placing data appropriate to the history of the new version, as described above, in the PREVIOUS_ENTITY_VERSION_IDENTIFIER column 511 and CHILD_ENTITY_IDENTIFIER column 512 of each row created for the new entity version.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A computer-implemented method of tracking entities in a database, in which entities are collections of one or more accounts, and accounts are collections of one or more identities, comprising:

assigning each account of a plurality of accounts a unique oldest entity identifier belonging only to the account, wherein the unique oldest entity identifier is the unique entity identifier assigned to a unique oldest entity that contains only the account and contains no other accounts;

monitoring an age of each account of the plurality of accounts by attaching a timestamp to each account at the time each account is created; and reusing an identifier for an oldest entity when merging two accounts into a first entity by naming the first entity as the reused identifier for the oldest entity, wherein the two accounts are merged into the first entity by placing the two accounts into the first entity;

adding the oldest entity contained in a first entity into a second entity with the merging of a first entity into the second entity;

indirectly containing in the first entity the plurality of accounts other than the account the first entity uniquely identifies;

displaying the entities in the database.

2. The method of claim 1, wherein:

the identifier of the unique original entity is the unique oldest entity identifier of an oldest account contained in the unique oldest entity.

3. The method of claim 1, wherein:
the identifier of the unique original entity is the unique oldest entity identifier of a newest account contained in the unique oldest entity.

4. The method of claim 1, wherein:
in the case that a first account contains more identities than any other account contained in the unique oldest entity, the identifier of the unique oldest entity is the unique oldest entity identifier of the first account; and
in the case that a second account contains more identities than any other account contained in the unique oldest entity and is the oldest of all accounts contained in the unique oldest entity, the identifier of the unique oldest entity is the unique oldest entity identifier of the second account.

5. The method of claim 1, further comprising:
resolving a first entity and a second entity into a single entity by:
  placing a first set of accounts of the first entity and a second set of accounts of the second entity into the single entity to form a single set of accounts of the single entity; and
  assigning an identifier to the single entity wherein the assigned identifier is the unique oldest entity identifier of the oldest account of the single set of accounts of the single entity.

6. The method of claim 1, further comprising:
reversing a merge of a first entity into a second entity and a third entity by:
  placing a first set of accounts of the first entity into the second entity;
  placing a second set of accounts of the first entity into the third entity, wherein no account of the plurality of accounts is contained within the first set of accounts and the second set of accounts simultaneously;
  assigning a first identifier to the second entity wherein the assigned first identifier is the unique oldest entity identifier of the oldest account of the first set of accounts; and
  assigning a second identifier to the third entity wherein the assigned second identifier is the unique oldest entity identifier of the oldest account of the second set of accounts.

7. An identity resolution system for a database being accessed by the identity resolution system, in which entities are collections of one or more accounts, and accounts are collections of one or more identities, the identity resolution system comprising:
creating an entity tracking table having an account identifier column, an oldest entity identifier column, and a current entity identifier column, wherein the entity tracking table stores information describing the entities for use by a user of the identity resolution system;
structuring the entity tracking table such that the account identifier column and the oldest entity identifier column are nonchangeable, and the current entity identifier column is changeable;
coordinating the entity tracking table with an entity version tracking table;
in response to an account entering the identity resolution system, creating a row of the entity tracking table with an account identifier for the account, an oldest entity identifier of a unique entity assigned to the account, and a current entity identifier equal to the oldest entity identifier;
the entity tracking table further storing an oldest account for the entity, an entity identifier of an entity that contains the current entity, a list of accounts contained in the current entity, and all entities contained by the current entity; and
displaying the entity tracking table to a user on a computer display.

8. The system of claim 7, the system further comprising:
in response to the account entering the identity resolution system for the first time, providing an age timestamp for the account.

9. The system of claim 7, the system further comprising:
providing an identifier for an entity by setting the current entity identifier column in the row for each account contained in the entity as the oldest entity identifier of the oldest account contained in the entity.

10. The system of claim 7, the system further comprising:
resolving a first entity and a second entity into a single entity by:
  placing the accounts of the first entity and the accounts of the second entity into the single entity; and
  assigning an identifier to the single entity by setting the current entity identifier column in the row for each account contained in the single entity as the oldest entity identifier of the oldest of the accounts of the first and second entities.

11. The system of claim 7, the system further comprising:
in response to an account entering the identity resolution system for the first time, providing an age timestamp for the account, wherein the age timestamp does not change.

12. The system of claim 7, the system further comprising:
finding an oldest entity of any given account in the identity resolution system wherein the oldest entity is the unique entity assigned to the given account in response to the given account entering the identity resolution system.

13. A computer program product comprising a computer useable medium including a computer readable program, in which entities are collections of one or more accounts, and accounts are collections of one or more identities, wherein the computer readable program when executed on a computer causes the computer to:
create an entity version table in a database having an entity version identifier column, an entity identifier column and a timestamp column, wherein the entity version identifier identifies a version of the entity; and
create a new version of an entity including:
  assigning the new version a version number in sequence across all entities, and assigning an individual version number across individual entities;
  translating between the version numbers sequenced across all entities and version numbers sequenced across the individual entities; and
  creating a row in the entity version table for each entity contained in the new version of the entity, wherein each of the created rows has the version number in the entity version identifier column, an identifier of the new version of the entity in the entity identifier column, and a timestamp of the new version of the entity in the timestamp column;
  ordering the entity version table in a predetermined order such that the rows of the entity version table are incorporated in a user-defined sentence:
  creating a backwards history of an entity as a graphical tree through both merged entities and separated entities; and
  reconstructing history of the entity backwards from any point in the entity version table.

14. The computer program product of claim 13, wherein:

the computer creates an entity tracking table having an account identifier column, an oldest entity identifier column, and a current entity identifier column; and the creating of a new version of an entity includes assigning the identifier of the new version of the entity by creating a row of the entity tracking table with an account identifier for an oldest account contained in the new version of the entity, an oldest entity identifier of a unique entity assigned to the oldest account, and a current entity identifier equal to the oldest entity identifier, wherein the current entity identifier is the identifier of the new version of the entity.

15. The computer program product of claim 13, wherein:

the creating of a new version of an entity includes:

determining whether the new version of the entity is created via a merge or unmerging;

in the case that the new version of the entity is created via a merge, indicating merge in a resolution type column of the entity version table in each of the created rows; and in the case that the new version of the entity is created via unmerging, indicating unmerging in a resolution type column of the entity version table in each of the created rows.

16. The computer program product of claim 13, wherein:

the creating of a new version of an entity includes:

for each entity contained in the new version of the entity, placing an identifier of the entity in a child entity identifier column of the row created for the entity.

17. The computer program product of claim 13, wherein:

the creating of a new version of an entity includes:

for each entity contained in the new version of the entity, placing the version number of a next previous version of the entity in a previous entity version identifier column of the row created for the entity.

18. The computer program product of claim 13, wherein:

in the case that the new version of the entity is created via a merge, the creating of a new version of an entity includes:

for each entity contained in the new version of the entity, creating a new row in the table for the entity with an identifier of the entity in a child entity identifier column of the row created for the entity.

* * * * *